March 26, 1940.   M. A. FRANK   2,194,459
BUMPER FOR MOTOR VEHICLES
Filed March 14, 1939   2 Sheets-Sheet 1

INVENTOR:
MILTON A. FRANK
BY *Frederic Vale*
ATTORNEY.

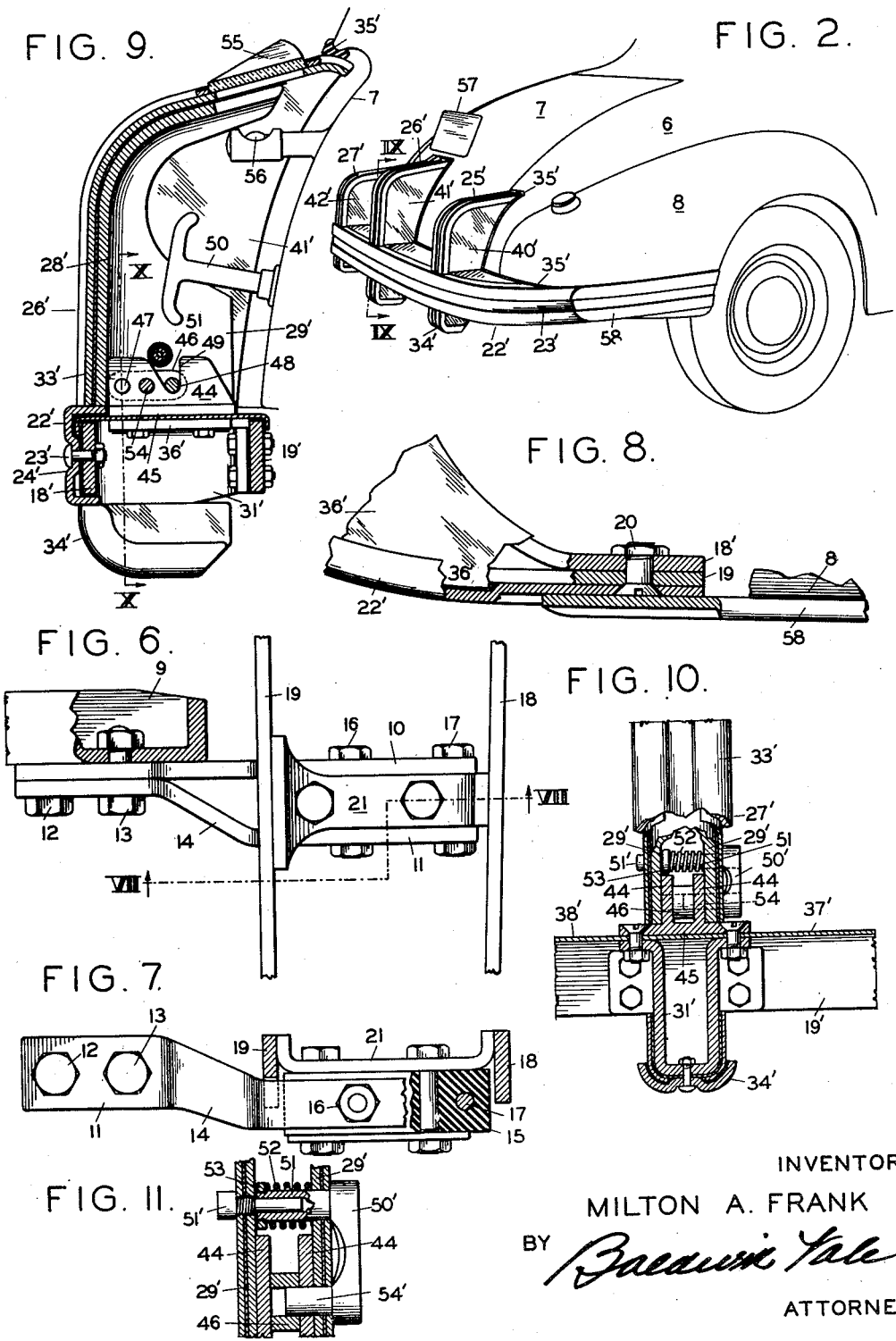

Patented Mar. 26, 1940

2,194,459

UNITED STATES PATENT OFFICE 2,194,459

BUMPER FOR MOTOR VEHICLES

Milton A. Frank, San Anselmo, Calif.

Application March 14, 1939, Serial No. 261,782

5 Claims. (Cl. 293—55)

This invention relates to an improved bumper for motor vehicles and, more particularly, to the construction and arrangement of the bumper with respect to the frame and body of the vehicle.

It has been the practice heretofore to mount conventional bumpers on the opposite ends of the vehicle frame and spaced away from the vehicle body at all points.

Such bumpers are traffic hazards. Since there is no standard height above the road surface, the bumpers of adjacent vehicles become interlocked in parking and end-to-end collisions. This condition is further aggravated by vertical guards attached to the horizontal bumpers, and spaced away from the body. This multiplying of exposed ends, including the projecting ends of the bumper, increases the liability of entanglement with other vehicles and the injury hazard to persons coming forcibly in contact with the same.

Among the objects of the present invention is the elimination or minimizing of the disadvantages of the conventional types of bumpers above described.

Another object is to combine the bumper with the frame and body of the vehicle so as to provide maximal protection to the exposed areas of the vehicle upon which it is mounted.

Another object is to close the gap between the bumper parts and the adjacent parts of the vehicle body.

A further object is to provide a bumper structure that may be harmoniously incorporated in the streamline contour of the modern motor car.

Other objects and advantages will appear as the description progresses.

Broadly stated, the invention comprises a bumper, resiliently mounted upon the frame of the vehicle, and having parts in telescoping relation to the vehicle body.

In this specification and the accompanying drawings, the invention is disclosed in its preferred form. It is to be understood, however, that it may be embodied in other forms within the purview of the claims following the description.

In the two sheets of drawings:

Fig. 2 is a similar view of the rear portion of the same.

Fig. 6 is a plan view, partly in horizontal section, showing one of the brackets for attaching the present bumper to the frame of the motor vehicle, certain parts of the bumper construction being omitted for clarity.

Fig. 7 is a side elevation of the same, partly in vertical section, taken along the line VII—VII in Fig. 6.

Fig. 8 is a horizontal section illustrating the structure of one of the ends of the bumper adjacent to the fender of the motor vehicle.

Fig. 9 is a vertical section taken along the line IX—IX in Fig. 2 showing the structure of the center rear bumper guard constructed to enable easy access to the luggage compartment of the vehicle.

Fig. 10 is a vertical section of the same taken along the line X—X, Fig. 9.

Fig. 11 is an enlarged detail view in vertical section showing the latch for locking the center rear bumper guard in fixed position.

Figure 1:
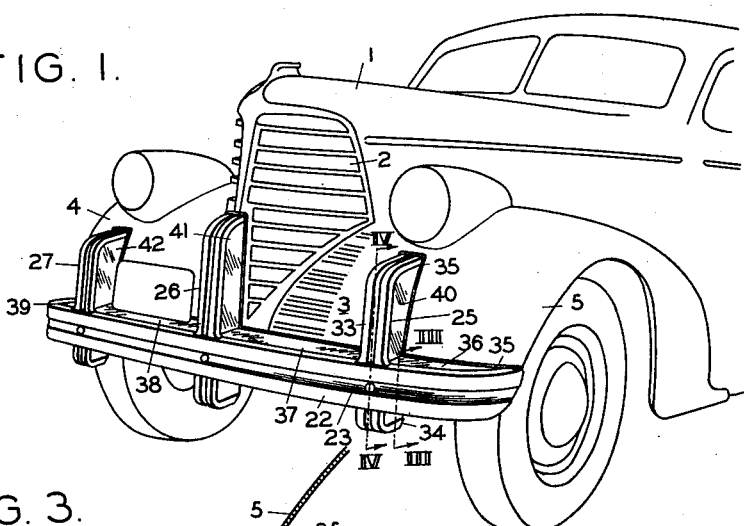
Fig. 1 is a perspective view of the front portion of a motor vehicle having a bumper constructed in accordance with this invention and incorporated therein.

In detail, the structure illustrated in the drawings, referring first to Fig. 1, comprises a conventional motor vehicle having a hood 1, the grill 2, the apron 3, and the front fenders 4 and 5 forming the front thereof. The rear portion 6 shown in Fig. 2 includes the luggage compartment door 7 and the right rear fender 8.

The modern knee action motor car has two front frame extensions such as 9 in Fig. 6, corresponding to the front ends of the side frames of other models using longitudinal leaf springs and to which the present bumper can be attached.

The attaching means in the present instance comprise a pair of brackets each consisting of the two plates 10, 11 lying together and affixed to the extensions 9 by the bolts 12, 13, Figs. 6, 7. One of the plates is offset as at 14. The outer ends are thus spaced apart to receive a block 15 of resilient material such as rubber, held in position by interspaced cross bolts, such as 16, 17. The exact form of these brackets will vary with the type of vehicle frame to which they are attached. The horizontal truss of the bumper structure includes the front and rear bars 18, 19 extending across the vehicle in a substantially bow shape, with interspaced center portions and converging ends, bolted together as at 20 in Fig. 8.

U shape struts such as 21 are interposed between and secured to the bars 18, 19. The struts are bolted through the rubber blocks 15 in the attaching bracket assembly. These struts 21 can have their opposite ends welded or by other means secured to the bars 18, 19 respectively. The base truss of the bumper assembly is thus resiliently mounted upon the vehicle frame through the intermediate rubber blocks 15.

The exposed front bumper plate 22 is preferably channel shape in cross section, with its flanges overhanging the edges of the front bar 18 and held in position by bolts such as 23, spaced along its length. The front face of the bumper plate 22 may be plated and polished if desired. It also may have a longitudinal groove 24 to stiffen the member against buckling under impact.

Figure 4:
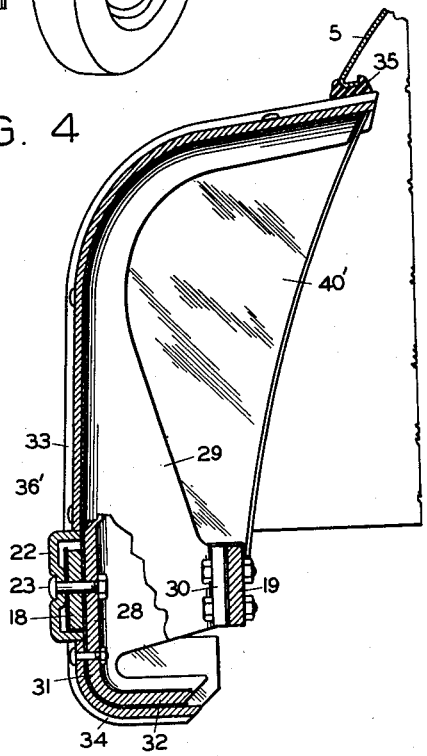
Fig. 4 is a similar view taken along the line IV—IV in Fig. 1 and showing the construction of one of the bumper guards.
Figure 5:
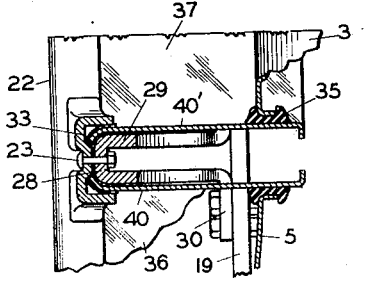
Fig. 5 is a horizontal section of the frame taken along the line V—V in Fig. 3.

The vertical grill and fender guards 25, 26, 27, respectively, are all rigidly fixed to and extend above and below the bumper truss. These guards are recessed into the fenders 4, 5 or apron 3 and the grill 2, depending upon the longitudinal placing of the guards, to allow for the torsional distortion and resilient movement of the bumper assembly. These guards are similar in construction and preferably consist of a die pressed brace 28 of the desired contour, having the opposed sides 29, 29 with lateral lugs 30 bolted to the inner face of the truss bar 19, see Fig. 4. The brace is also bolted at its front edge to the front bar 18 by one of the bolts 23. The brace 28 has the extension 31 below the truss assembly with its end 32 bent backward under the truss. The rigid channel shape facings 33, 34 are affixed to the brace 28.

Wherever any of the vertical guards 25—27' telescope into adjacent parts of the vehicle body, the edges of the recesses therein are turned inward and provided with rubber buffers 35, which make wiping contact with the telescoping bumper parts.

To cover the underlying structures, the thin sheet metal shrouds, such as 36, 37, 38, 39, overlie the tops of the bars 18, 19 and are flanged down thereover. These shrouds are shaped to extend up the opposite sides of the adjacent guards as at 40, 40', 41, 42, in Figs. 1, 3, 4.

Figure 3:
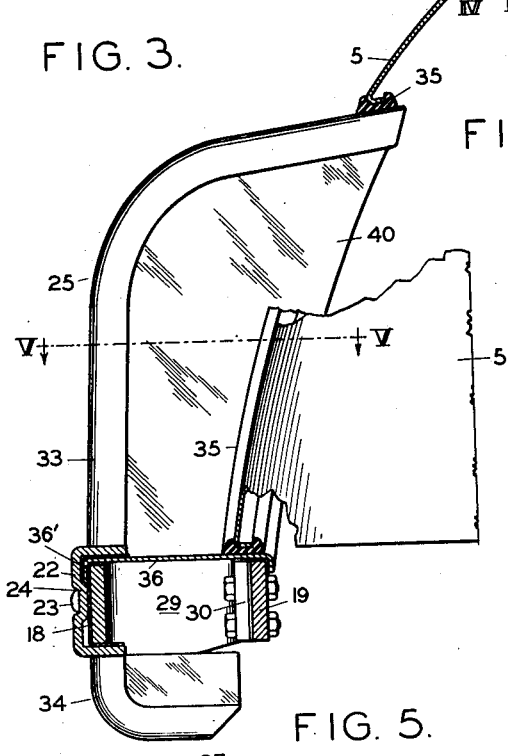
Fig. 3 is an enlarged vertical section taken along the line III—III in Fig. 1 showing details of the bumper construction.

These shrouds are held in place by having their flanged edges clamped between the bar 18 and the facing plate 22, see Fig. 3, and between the braces 28 and the flanges of the facings 33. Suitable gaskets such as 36' are interposed between the shrouds and the clamping surfaces to prevent rattling.

Structural details will vary according to the body structure of the vehicle and the front and rear bumper installations.

The rear bumper, as in Figs. 2, 8, 9, 10, 11, is similar in general construction and mounting as above described, and similar reference characters have been applied to corresponding parts thereof, with the addition of the prime sign.

To permit access to the rear compartment door 7, the center guard 26' is hinged to the bumper truss on the brace such as 31' fixed between the bars 18', 19'. The hinge channel 44, 44 has its base 45 bolted to the under brace 31' fixed to the bumper as in Fig. 10. The opposed sides 29', 29' of the brace 28' straddle this channel 44. The link 46 lies within the channel and pivots on the pintle 47 passing through the walls of the channel. The opposite end of the link has mounted therein the pivot 48, passing through the sides 29', 29', and lying in notches such as 49 in the channel walls in the closed position.

To expose the lock handle 50, the guard 26' is lifted and swung rearwardly on the pintle 47, the pin 48 rising out of the notches 49. The juncture of the guard with the recessed compartment door 7 is sealed by the rubber strip 35'.

In the closed position the brace 28' abuts the ends of the hinge channel 44, which transmits any shock of the guard directly to the bumper truss assembly through the base 45.

The guard 26' is locked in closed position by any suitable means. The latch shown comprises the external cross bar 50', having the sleeve 51 fixed thereto which extends through one of the sides 29' and terminates near the opposite side 29'. This sleeve telescopes over the stud pin 51' fixed in the side 29' and the nut 53 threaded on the sleeve.

The opposite end of the cross bar 50' has the hardened latch bolt 54 extending through registering holes in the adjacent channel wall 44 and the link 46. This bolt 54 locks the guard 26' rigidly to the bumper and prevents this guard swinging inwardly by any impact force applied to this guard.

The latch bolt 54 is withdrawn from the link by grasping the crossbar 50' and pulling outward against the tension of the spring 42. An outward pull on the crossbar 50' unlocks the guard for free action of the hinge link 46. In the unlocked condition the crossbar sleeve 51 can be rotated on the stud 51' until the latch bolt 54 rests against the side shroud of the guard 26' to hold the bolt in the unlocked position.

The upper portion of the guard is provided with a lens 55 adapted to transmit light from the light bulb 56 to illuminate the license plate 57.

The rear guards 25', 27' are recessed into the adjacent vehicle body similarly to the front guards previously described.

The rear fenders 8 are provided with chafing plates, such as 58 in Figs. 2, 8, fixed thereto and overlying the adjacent ends of the rear bumper 22'. This reinforces the fender skirts at this portion, conceals the ends of the bumper and by merging the rear bumper into the lines of the fender conceals the bumper ends.

The vertical guards and horizontal bumper members have been shown and described as telescoping into and passing beneath the adjacent parts of the vehicle body. They could be spaced away from the body a distance consistent with the mounting resiliency and bear upon resilient rubber cushions interposed between bumper members and the adjacent body parts as a substitute for recessing the body, to prevent the intrusion of anything between the bumper parts and the vehicle body.

It will be apparent that recess members could be attached to the outside of the vehicle body to telescope with the bumper parts, instead of recessing the adjacent parts of the body. It is the spirit of the invention to close the gap between the bumper and the body.

Having thus described this invention, what I claim and desire to secure by Letters Patent is:

1. A bumper for a motor vehicle having a main frame and a body; a plurality of bumper bars with interspaced middle portions and connected ends forming a truss attachable to said frame; vertical guards on said truss contiguous to a resilient member on the adjacent body portion; and shrouds covering the top of said truss and the sides of said guards.

2. A bumper for a motor vehicle having a main frame, body, and fenders; a transverse bumper bar attachable to said frame and overlapping said fenders; chafing plates on said fenders and overlapping the ends of said bar; and vertical guards on said bar contiguous to a resilient member on the adjacent body portion.

3. A bumper for a motor vehicle having a main frame and a body having vertical recesses therein; brackets attachable to said frame; resilient blocks attached to said brackets respectively; a transverse bumper attached to said blocks independent of said brackets; and vertical guards on said bumper and telescoping within said recesses respectively.

4. A bumper for a motor vehicle having a main frame, and a body with a vertical recess therein; a transverse bumper bar attachable to said frame; a vertical guard hinged to said bar and telescoping within said recess; and a resilient buffer interposed between the edges of said recess in chafing contact with the contiguous guard surfaces.

5. A bumper for a motor vehicle having a main frame, and a body with a recessed door; a transverse bumper bar attachable to said frame and having a transverse hinge member; a vertical guard telescoping within said recess in the door; an interposed hinge link pivoted to said hinge member and guard respectively; and a latch bolt engaging said link and hinge member in the locked position.

MILTON A. FRANK.